United States Patent [19]
Bush et al.

[11] Patent Number: 5,275,771
[45] Date of Patent: Jan. 4, 1994

[54] EXPANSION REDUCTION OF CORDIERITE

[75] Inventors: Edward A. Bush, Painted Post; Rodney I. Frost, Corning, both of N.Y.

[73] Assignee: Corning Incorporated, Corning, N.Y.

[21] Appl. No.: 927,379

[22] Filed: Aug. 10, 1992

Related U.S. Application Data

[63] Continuation-in-part of Ser. No. 816,227, Jan. 3, 1992, abandoned.

[51] Int. Cl.$^5$ .............................................. C04B 41/00
[52] U.S. Cl. .................. 264/63; 264/177.11; 264/177.12; 264/211.11; 264/211.13; 264/234; 264/340; 264/345
[58] Field of Search .............. 264/63, 211.11, 211.13, 264/234, 340, 345, 177.12, 177.11

[56] References Cited

U.S. PATENT DOCUMENTS

| | | | |
|---|---|---|---|
| 3,885,977 | 5/1975 | Lachman et al. | 106/62 |
| 3,953,562 | 4/1976 | Hait | 264/63 |
| 3,958,058 | 5/1976 | Elmer | 428/220 |
| 3,979,216 | 9/1976 | Fritsch, Jr. et al. | 106/62 |
| 4,024,079 | 5/1977 | Okuyama | 502/216 |
| 4,162,285 | 7/1979 | Tanabashi | 264/209.1 |
| 4,329,162 | 5/1982 | Pitcher, Jr. | 55/523 |
| 4,415,344 | 11/1983 | Frost et al. | 55/523 |
| 4,579,707 | 4/1986 | Kobayashi | 264/63 |
| 4,869,944 | 9/1989 | Harada et al. | 428/116 |
| 4,871,495 | 10/1989 | Helferich | 264/344 |

OTHER PUBLICATIONS

D. P. H. Hasselman, "Crack Growth and Creep in Brittle Ceramics," *Journal of the American Ceramic Society*, vol. 52, No. 9 (1969).

S. M. Wiederhorn, "Subcritical Crack Growth in Ceramics," *Fracture Mechanics of Ceramics*, edited by R. C. Beadt, D. P. H. Hasselman, and F. F. Lange, Plenum Press, 1973.

S. W. Freiman, "Environmentally Enhanced Fracture of Ceramics," *Materials Research Society Symposium Proceedings*, vol. 125, p. 205 (1988).

S. L. Dole, O. Hunter, Jr., F. W. Calderwood, and D. J. Beret, "Microcracking of Monoclinic HfO$_2$," *Journal of the American Ceramic Society*, vol. 61, Nos. 11-12, pp. 46-90 (1978).

W. R. Manning, G. E. Youngblood, and D. P. H. Hasselman, "Effect of Microcracking on the Thermal Diffusivity of Polycrystalline Aluminum Niobate," *Journal of the American Ceramic Society*, vol. 60, No. 9-10 (1977).

*Primary Examiner*—James Derrington
*Attorney, Agent, or Firm*—Michael L. Goldman; Richard N. Wardell

[57] ABSTRACT

A reduced coefficient of thermal expansion and an increased resistance to thermal shock in cordierite-containing ceramic articles is achieved by contacting such articles with water either in a liquid or gaseous state. It is particularly desirable for such treatment to reduce the coefficient of thermal expansion of the article by at least $1 \times 10^{-7}$° C.$^{-1}$, measured between 25° and 800° C., during the contacting. This treatment can be used in conjunction with extruded honeycomb structures conventionally used as diesel particle filters and supports for catalysts which treat automotive exhaust gases.

20 Claims, 3 Drawing Sheets

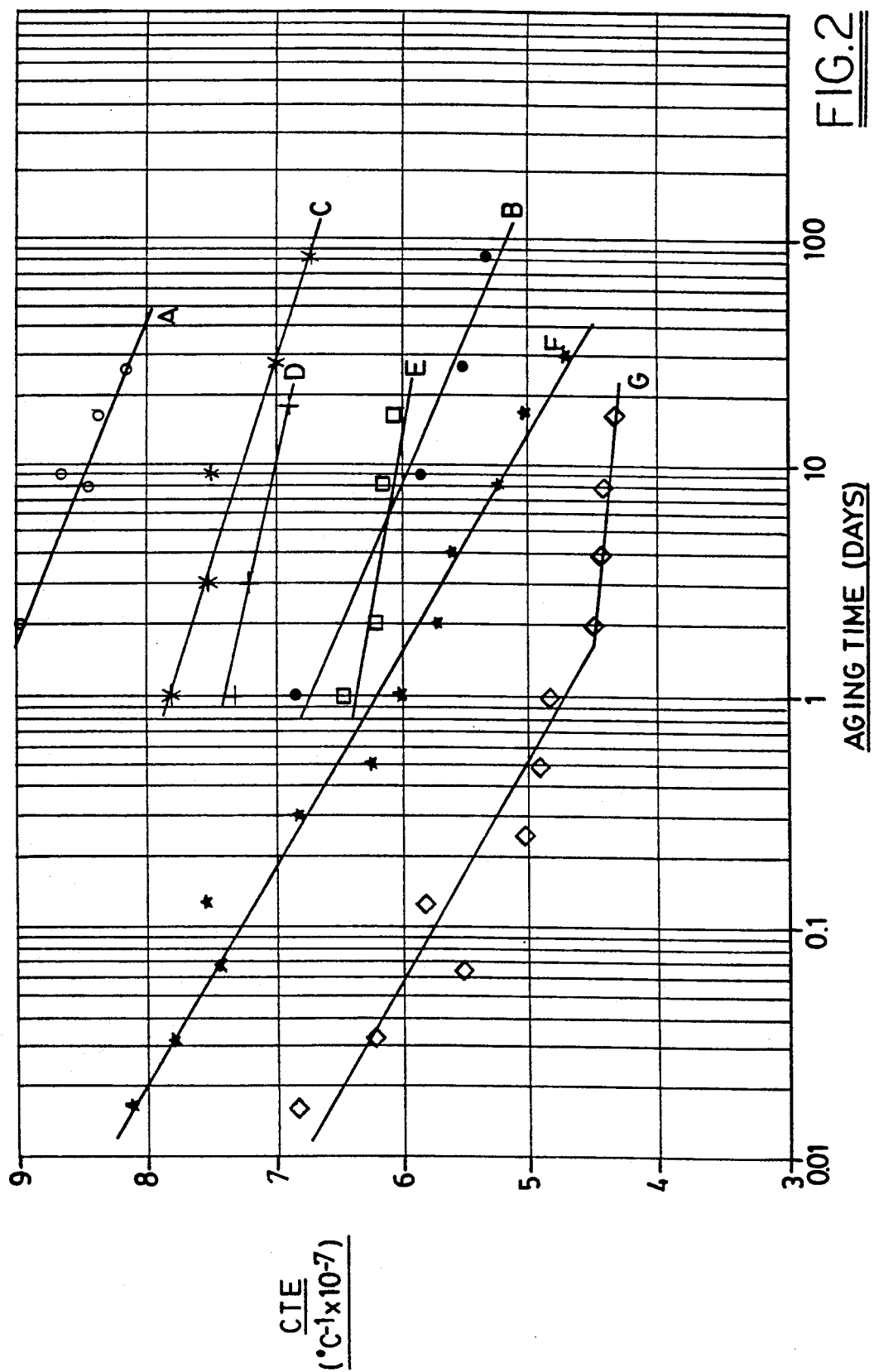

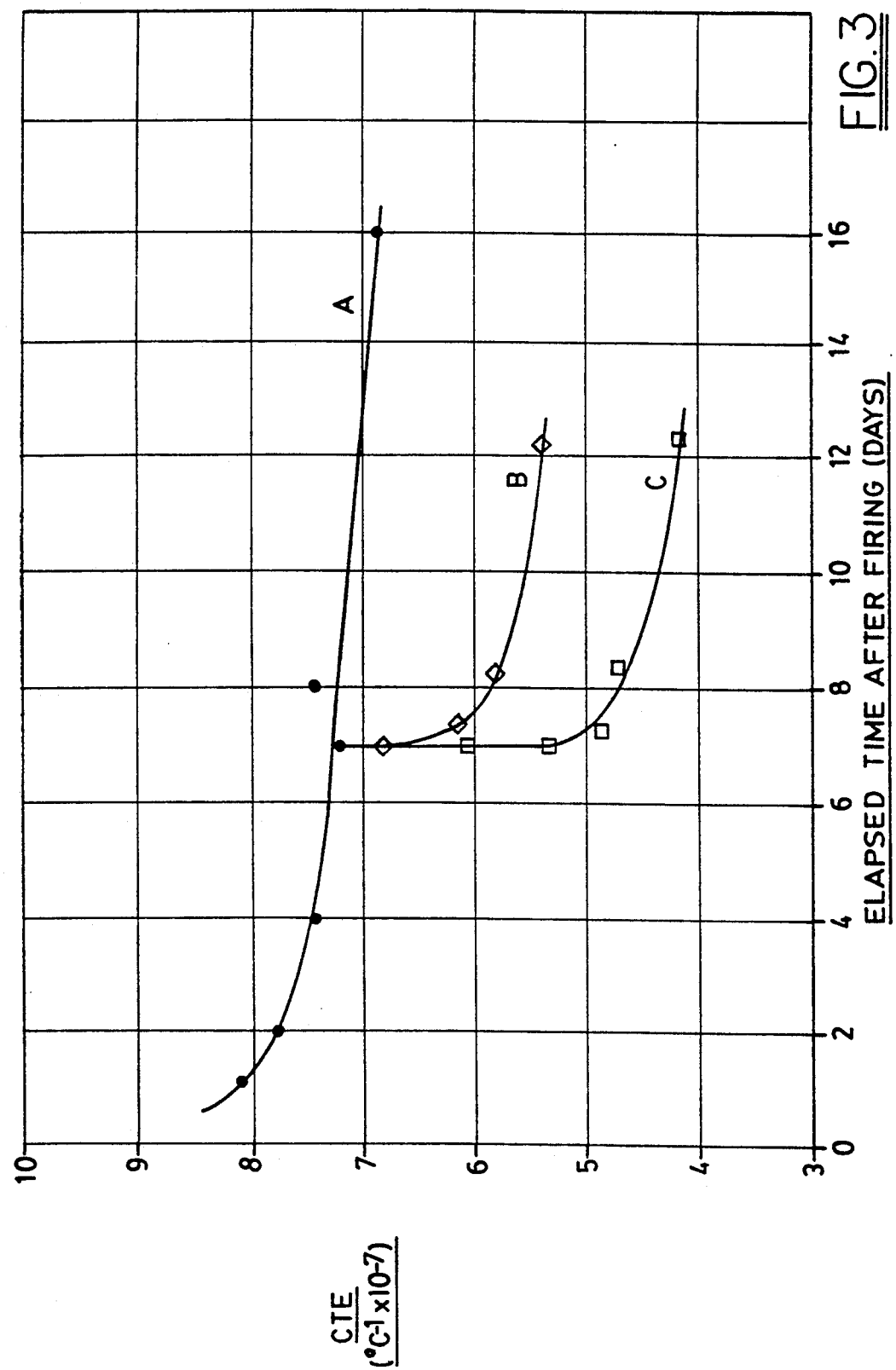

EXPANSION REDUCTION OF CORDIERITE

This is a continuation-in-part of U.S. patent application Ser. No. 816,227, filed Jan. 3, 1992, now abandoned.

FIELD OF THE INVENTION

The present invention relates to increasing thermal shock resistance and reducing the coefficient of thermal expansion in cordierite-containing articles.

BACKGROUND OF THE INVENTION

Automobile exhaust gases are conventionally purified with a catalyst supported on a ceramic body able to withstand high temperatures. The preferred catalyst support structure is a honeycomb configuration which includes a multiplicity of unobstructed parallel channels sized to permit gas flow and bounded by thin ceramic walls. The channels may have any configuration and dimensions provided gases can freely pass through them without being plugged by entrained particulate material. Examples of such preferred structures include the thin-walled ceramic honeycomb structures described in U.S. Pat. No. 3,790,654 to Bagley and in U.S. Pat. No. 3,112,184 to Hollenbach.

Ceramic honeycomb catalyst supports are exposed to high temperatures resulting from contact with hot exhaust gases and from the catalytic oxidation of uncombusted hydrocarbons and carbon monoxide contained in the exhaust gas. In addition, such supports must withstand rapid temperature increases and decreases when the automobile engine is started and stopped. Such operating conditions require the ceramic honeycomb catalyst support to have a high thermal shock resistance, a property generally inversely proportional to the coefficient of thermal expansion.

Generally similar ceramic structures are used as diesel engine particulate filters. In such applications, ceramic honeycomb filters are fitted to diesel engine exhaust systems for removal of particulates from the high temperature diesel engine exhaust gases. Examples of diesel engine particulate filters are disclosed in U.S. Pat. No. 4,329,162 to Pitcher, Jr. and U.S. Pat. No. 4,415,344 to Frost et al. Again, the ceramic materials utilized in such applications must have a high thermal shock resistance and a low coefficient of thermal expansion.

Cordierite ($2MgO \cdot 2Al_2O_2 \cdot 5SiO_2$) is known to display a very low thermal expansion over a wide range of temperature. In substantial amounts, cordierite gives a ceramic body excellent thermal shock resistance when subjected to rapid and severe changes in temperature. This property has caused cordierite to find widespread use as a catalyst support for automotive catalytic converters and as diesel engine particulate filters. Despite the low average coefficient of thermal expansion of corderite crystals, the need further to reduce this value in ceramic articles remains a desired objective.

U.S. Pat. No. 3,885,977 to Lachman et al. ("Lachman") forms an extruded, honeycomb carrier having thin walls extending between its ends, and comprising a mixture of clay, talc, and alumina which react during firing to form cordierite. Because of the orientation imparted to the clay and talc platelets during extrusion, the cordierite grains that develop during firing have a preferred orientation, with the cordierite crystallographic c-axes tending to lie in the plane of the walls and the a-axes tending to lie perpendicular to the plane of the walls, assuming that the cordierite is of the hexagonal variety. The thermal expansion of cordierite is known to be low, even negative, in the direction of the crystallographic c-axis and relatively high in the direction of the a-axis. As a result, a low coefficient of thermal expansion in the direction parallel to the walls and a higher coefficient of thermal expansion transverse to the walls is achieved. The low coefficient of thermal expansion aspect of the present invention is able to impart thermal shock resistance to the body as a whole. By contrast, the effect of the transversely-extending high coefficient of thermal expansion regions is minimal, because any expansion in such directions is accommodated by internal spaces in the honeycomb.

Cordierite bodies produced in accordance with Lachman are generally formed as elongate logs and then cut into shorter pieces after firing. To limit dust generation, water at a temperature of 5° to 18° C. is sprayed on the log during cutting. After cutting, the short pieces are washed and become fully saturated with water as they pass beneath a water curtain with the water being at a temperature of 5° to 18° C. A few minutes later, the washed pieces are blasted with air to remove water from their exterior and channels; some moisture, however, remains absorbed within the cordierite walls. A few minutes after air blasting, the pieces enter a drier, operating at temperatures in excess of 190° C. After 17 minutes of drying, the pieces are removed from the dryer in a completely dry state. From cutting through drying, water remains in contact with the cordierite body for about 20 minutes. This treatment has little effect on the body's coefficient of thermal expansion.

In U.S. Pat. No. 3,958,058 to Elmer, cordierite with an ultra-low thermal expansion coefficient and a high thermal shock resistance is obtained by treating it with a strong mineral acid. The acid is said to remove $Al_2O_3$ and MgO, while the low expansion values are partly attributable to microcracks in the leached material. It has been elsewhere recognized that the internal stresses in highly anisotropic crystalline cordierite ceramics lead to microcracking. Despite its ability to reduce a cordierite article's coefficient of thermal expansion, this acid treatment has not received wide acceptance, because it requires specialized handling systems for the acid, it chemically modifies the cordierite product by removal of $Al_2O_3$ and MgO, and it can cause large reductions in mechanical strength.

U.S. Pat. No. 3,979,216 to Fritsch, Jr. et al. relates to the production of synthetic cordierite ceramics having thermal expansions below 1100 ppm in the temperature range of 25°–800° C. and 15 to 150 micrometer microcracks. This product is prepared by mixing talc, clay, and alumina, consolidating this mixture as a green body, heating at 150° C. per hour to a temperature of 1350° to 1425° C., holding at this elevated temperature for 0.5 to 10 hours, and cooling to below 1000° C. at a rate of −150° C. per hour. Thermal expansion is said to be dependent upon maintaining a low glass content in the body.

U.S. Pat. No. 4,869,944 to Harada et al. relates to a cordierite honeycomb structural body formed by including high purity, non-crystalline silica in a mixture of talc, kaolin, and alumina. As a result, crystals with their c-axes preferentially oriented in the plane of the walls are formed. Structural microcracking occurs to the same degree regardless of whether or not high purity, non-crystalline silica is incorporated in the mixture; however, the use of silica causes more microcracks to form along the crystallographic c-axis direction of the crystals in the domain structure. With such microcrack orientation, the article is able to absorb positive thermal expansion better and give the body a low coefficient of thermal expansion.

SUMMARY OF THE INVENTION

The present invention relates to a process of reducing the coefficient of thermal expansion of an anisotropic, polycrystalline sintered ceramic article having cordierite as its primary phase and an oxide composition of 9-20 wt. % MgO, 30-50 wt. % $Al_2O_3$, and 41-56.5 wt. % $SiO_2$. This is achieved by contacting such ceramic articles with water in a liquid or gaseous state to reduce the article's coefficient of thermal expansion by at least $1 \times 10^{-7\circ}$ $C.^{-1}$, measured between 25° C. and 800° C., during contacting.

When liquid water is used to contact the ceramic article, it is necessary to select contacting times and liquid temperatures effective to achieve the desired reduction in coefficient of thermal expansion (i.e., $1 \times 10^{-7\circ}$ $C.^{-1}$, preferably $2.0 \times 10^{-7\circ}$ $C.^{-1}$, measured between 25° C. and 800° C.). It has been found that this embodiment of the present invention works particularly well when the article is contacted with water at a temperature of 50° C. or above, preferably 90° C. or above. A contact period of less than 8 hours is desirable for process efficiency but longer times will reduce the coefficient of thermal expansion further if desired.

When treating ceramic articles with water vapor in a contact zone, a temperature and/or relative humidity exceeding that of the ambient atmospheric conditions surrounding and outside the contact zone should be utilized to reduce the coefficient of thermal expansion of the article by at least $1 \times 10^{-7\circ}$ $C.^{-1}$, measured between 25° C. and 800° C., during contact with water vapor. Again, such treatment is preferably carried out at an elevated temperature with the additional requirement that the relative humidity used to treat the article likewise be relatively high. Temperatures of 50° C. or above, preferably 70° C. or above, can be used. Relative humidities of 60% or greater, preferably 80% or greater, are useful. A contact time of less than 20 hours is desirable from an efficiency standpoint. However, longer times can achieve greater reductions in the coefficient of thermal expansion where needed.

Once treated in accordance with the present invention, cordierite bodies can be subjected to conventional post-sintering treatment. For example, cordierite honeycomb articles used as catalytic converter supports can be dip-coated with catalyst after treatment in accordance with the present invention.

BRIEF DESCRIPTION OF THE DRAWINGS

FIG. 2 is a plot of the coefficient of thermal expansion versus treatment time on a logarithmic scale for cordierite honeycomb articles treated under various conditions.

FIG. 3 is a plot of the coefficient of thermal expansion versus the elapsed time after firing cordierite honeycomb articles for various post-firing treatment conditions.

DETAILED DESCRIPTION OF THE INVENTION AND DRAWINGS

Figure 1:
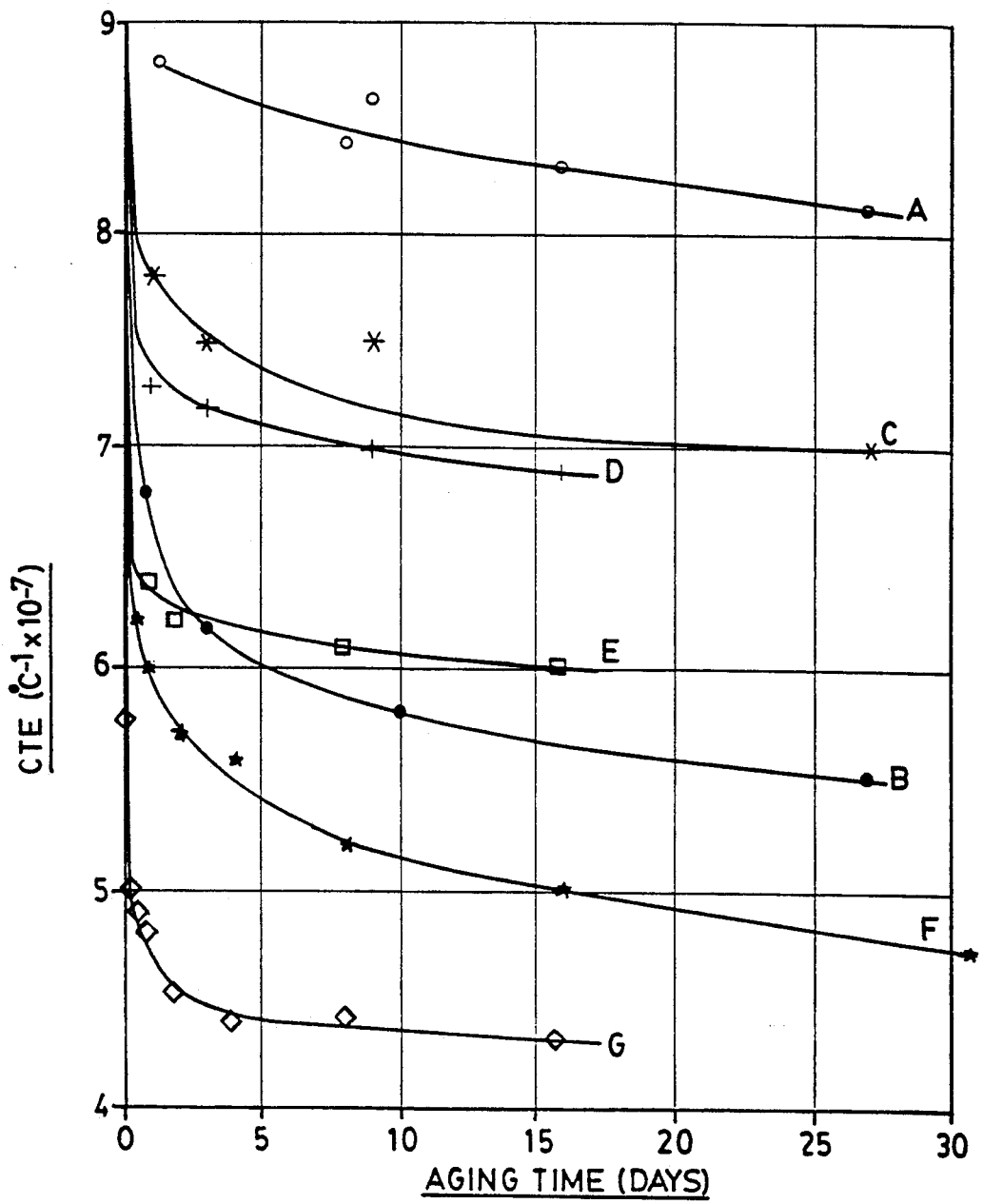
FIG. 1 is a plot of the coefficient of thermal expansion versus treatment time for cordierite honeycomb articles treated under various conditions.

Anisotropic, polycrystalline, sintered ceramic articles having cordierite as their primary phase are treated to reduce their coefficient of thermal expansion and, consequently, to improve their resistance to thermal shock. This is achieved by contacting such articles with water in a liquid or gaseous state under conditions of time, temperature, and relative humidity (for vapor treatment only) to reduce the article's coefficient by at least $1 \times 10^{-7\circ}$ $C.^{-1}$, measured between 25° C. and 800° C., during the period it is in contact with the water. This process involves substantially no application of external stresses to the article. It instead takes advantage of the internal stresses naturally present in cordierite ceramics because of the thermal expansion anisotropy of the cordierite grains. It is these internal stresses that are believed to make the material subject to stress corrosion in the presence of water. Thus, internal stresses have the greatest intensity at the sharp tips of defects and existing microcracks in the cordierite body. It is at these locations that stress-corrosion takes place, resulting in the propagation of cracks initiating at the defects and in the extension of pre-existing microcracks. It is such accelerated microcracking that is responsible for the article's reduced coefficient of thermal expansion and increased thermal shock resistance, all in a short time period.

In one form of the present invention, cordierite-containing articles can be treated with water in a liquid state by either immersion or spraying. Treatment times and water temperatures should be selected to effect a reduction in the coefficient of thermal expansion of the article during such treatment by $1 \times 10^{-7\circ}$ $C.^{-1}$, preferably $2.0 \times 10^{-7\circ}$ $C.^{-1}$, measured between 25° C. and 800° C. Under atmospheric pressures, the temperature of the water can be 10°-100° C., preferably 50°-100° C., more preferably 90°-100° C., and most preferably 98°-100° C. It is also possible to use higher temperatures if water contact is at superatmospheric pressures. Treatment times may be lengthy, but are preferably less than 8 hours to achieve process efficiency. In general, the higher the water temperature is, the more rapidly a desired reduction in the coefficient is achieved. For example, immersion in 100° C. water for a period of 12 to 75 minutes is sufficient to reduce the coefficient of thermal expansion of a cordierite body by $1.0 \times 10^{-7\circ}$ $C.^{-1}$, measured between 25° C. and 800° C. When the water is instead at 22° C., a contact period of 4 hours to 8 hours is required to reduce such a body's coefficient to that extent. The use of either immersion condition achieves a dramatic reduction in the coefficient of thermal expansion compared to simply placing the body in inventory at natural ambient conditions. During such inventorying, it may take months or even years to reduce the coefficient of thermal expansion to the same degree. To achieve such results, it is desirable to apply sufficient water in a liquid state to the cordierite-containing article—i.e., to fill the pores, microcracks, and other defects completely with water. A cordierite honeycomb, typically having, for example, a porosity of 35%, would require about 210 grams of water per kilogram of ceramic for saturation.

In an alternative embodiment of the present invention, water in a vapor state can be used to contact and reduce the coefficient of thermal expansion of sintered, cordierite-containing articles in a contact zone. The temperature and/or relative humidity in the contact zone exceeds that of the ambient atmosphere surrounding and outside the contact zone. Such water vapor treatment can be effected by spraying water into the terminal end of the firing kiln or by placing the cordierite-containing article in a humidity cabinet after the article is fired. Although it is possible to carry out such contact with water vapor at temperatures of 50° C. or above (e.g., 50°-200° C.), it is more preferable to utilize temperatures of 70° C. or above (e.g., 70°-150° C.) and most preferable to employ temperatures of 80° C. or above (e.g., 80°-100° C.). At temperatures above 200° C., treatment with water vapor has little effect in reducing the coefficient of thermal expansion, perhaps due to cordierite's reduction in stress at such higher temperatures. The relative humidity of the moisture containing environment should be on the order of 60% or above (e.g., 60-100%) relative humidity, preferably 80% or above (e.g., 80-98%) relative humidity, and most preferably 90% or above. Although contact times can be lengthy, it is desirable for them to be less than 20 hours to achieve process efficiency. A more rapid reduction in the coefficient of expansion is achieved when high temperatures and high relative humidities are utilized. For example, a cordierite body treated with water vapor at a relative humidity of 70% and a temperature of 80° C. achieves a reduction in the coefficient of thermal expansion of $1 \times 10^{-7}$° $C.^{-1}$, measured between 25° C. and 800° C., within 4 to 20 hours. Such reduction in the coefficient is achieved in 2 to 12 hours at a relative humidity of 98% and a temperature of 50° C. and in 1 to 10 hours at a relative humidity of 98% and a temperature of 80° C. Again, this reduction occurs much faster than for sintered cordierite containing articles placed in inventory at normal ambient atmospheric conditions.

After treatment of cordierite containing articles with either liquid water or water vapor, the articles can be dried. However, it is advantageous not to include a drying step with vapor treated articles, because water film remaining on the articles will continue to promote microcracking. This will further reduce the coefficient of thermal expansion.

The process of the present invention is particularly suitable for treatment of structures having an extruded honeycomb configuration with a matrix of thin walls forming a multiplicity of open-ended cells. The cells extend from one end of the honeycomb to the other, and the thin walls have a substantially smaller coefficient of thermal expansion in the direction parallel to the axes of the open-ended cells than transverse to the thin walls. Such articles and their production are fully disclosed in U.S. Pat. No. 3,885,977 to Lachman et al., which is hereby incorporated by reference.

In producing a cordierite-containing honeycomb structure, the selection of the quantity of raw materials which comprise the batch will depend on the fired composition sought. Generally, talc, silica, alumina, aluminum hydroxides and magnesia-yielding chemicals are used with the proportions of clay, talc, silica, aluminum hydroxides, and alumina chosen to produce cordierites analytically consisting essentially of 41-56.6% $SiO_2$, 30-50%, $Al_2O_3$, and 9-20% MgO. The total weight of MgO, $Al_2O_3$, and $SiO_2$ is at least 97% of the entire weight of the ceramic article.

The crystals of cordierite, treated in accordance with the present invention, become preferentially oriented during the firing process. This is accomplished by the use of raw materials in the form of flat, planar particles (i.e., platelets) rather than large isodimensional particles. Suitable platy materials are found in various talcs and delaminated clays, such as delaminated kaolin.

The term platelet refers to the shape and geometry of a particle of material. The particle has two long dimensions and one short dimension—i.e. the length and width of the platelet are much larger than its thickness. The length and width need not be equal, but they must be much greater than the thickness of the platelet.

The mixture of raw materials is blended with water and extrusion aids to achieve sufficient plastic flow to orient the platelets properly. Extrusion aids, such as methyl cellulose and sodium stearate, are added to give the mixture formability and green strength prior to firing. Water, which also aids plastic formability, should be utilized at a level of 15-36% based on the weight of dry material.

Once a blend of raw materials in a plastically formable state is prepared, it can be subjected to a plastic flow or extrusion step which orients clay and talc platelets in the green ware. In forming structures with thin web and thin ribbon material, the desired orientation of clay and talc platelets is in the plane of the webs. Other forming methods such as rolling and pressing of sheets, which may be assembled into honeycomb structures, can similarly be produced with a favorable orientation.

In conventional isostatic forming methods, clay and talc particles of the batch tend to be left in the same orientation imparted during mixing and preforming preparation. By contrast, the present anisostatic method does not apply equal forces to all parts of the body being formed, and, therefore, the clay and talc platelets are caused to slip and rotate in the plastic batch while trying to reach a planar orientation. In pressing or extruding a ribbon of material, for example, the orientation results in an ideal configuration of the c-axis of the clay. The resulting cordierite crystals are oriented, after firing, to have the low expansion c-axes lying preferentially in the plane of the ribbon and the high expansion a-axes oriented transverse to that plane and parallel to the thin dimension.

When forming an open celled, thin walled honeycomb structure, in accordance with the present invention, cordierite is oriented to have a low expansion along the axes of the cells and a high expansion across the thin wall (but not across the entire body normal to the cell axes). The effect of the high expansion direction is minimal, because the internal spaces in honeycomb allow expansion of the thin walls into the cells. A typical honeycomb structure useful with the present invention has a wall thickness of between about 0.076 millimeters and about 1.27 millimeters with cell densities of between about 140 cells/square centimeter to about 1.4 cells/square centimeter. The thickness of the thin walls is not critical for achieving proper orientation, but thinner walls enable more complete and more consistent planar orientation.

Besides honeycomb structures, other shapes can be extruded or otherwise formed, and the anisotropy of the expansion will be controlled by the orientation imparted to the clay platelets during forming.

The firing range for the formed cordierite body should be 1340°-1440° C. with a soak time sufficient to yield a substantially complete reaction to the cordierite phase. Soak times of 6-12 hours may be used.

It is also possible to form cordierite bodies without clay or talc from a blend of 12-16 wt. % magnesium oxide, 35-41 wt. % aluminum oxide, and 43-53 wt. % silica, as taught by U.S. Pat. No. 5,114,644. Once forming aids are added to this blend to form a green body, the body can be dried and fired to form cordierite. Such firing is carried out by heating to a temperature of 1000°–1200° C. and increasing that temperature at a rate of 100° C./hr to a level of 1350° to 1450° C.

As disclosed in U.S. Pat. No. 5,114,643, bodies with at least 90 weight % cordierite can be prepared from a combination of either (1) silica and magnesium aluminate spinel, (2) silica, magnesium aluminate spinel, and a MgO yielding component, or (3) silica, magnesium aluminate spinel, and an $Al_2O_3$ yielding component. These materials, provided in the absence of clay and talc, are blended with vehicle and forming aids to impart formability. A green body is then formed, dried, and fired.

EXAMPLES

Example 1

Talc, clay, calcined clay, and alumina were mixed in amounts suitable to form a cordierite composition. After the mixture was plasticized with methyl cellulose, sodium stearate and water in a muller mixer, it was extruded through a steel die in a honeycomb configuration. After the honeycomb-shaped article was dried, it was fired in a periodic gas-fired kiln at 1400° C. Once cooled to room temperature, the article was immediately cut with a diamond saw to produce 100 bar-shaped specimens measuring approximately 0.64 cm × 0.64 cm × 5.6 cm. These specimens had about 62 square cells per square centimeter and a web thickness of about 0.18 millimeters. Groups of these specimens were then subjected to the treatments and treatment conditions described in Table 1.

TABLE 1

| Treatment Identification Letter | Treatment | Treatment Conditions Temp. (°C.) | Relative Humidity (%) |
|---|---|---|---|
| A | Desiccator over $CaSO_4$ | 22 | 0.02* |
| B | Desiccator over water | 22 | 100 |
| C | Contact with ambient air | 22 | ~35 |
| D | Water vapor treatment in a humidity cabinet | 43 | 20 |
| E | Water vapor treatment in a humidity cabinet | 43 | 98 |
| F | Liquid water immersion | 22 | — |
| G | Liquid water immersion | 100 | — |

*Calculated assuming 0.005 mg water/liter of air, from Handbook of Chemistry and Physics, 64th Edition, page E-37, CRC Press, Inc.

Periodically, specimens were removed from each of the treatments and measured for thermal expansion to 100° C., both heating and cooling, with a DILATRONIC I.S., 1200° automatic recording dilatometer, made by Theta Industries, Inc., 26 Valley Road, Port Washington, N.Y. Specimens that had been immersed in water (Treatments F and G) were dried in an oven at 100° C. for 2 hours before making thermal expansion measurements. When thermal expansion could not be measured immediately, the specimens were stored in a desiccator over $CaSO_4$ to minimize additional aging. Coefficients of thermal expansion ($10^{-7}$ °C.$^{-1}$) for the temperature range of 25° to 800° C. during heating are listed for treatments A to G at various treatment times in Tables 2 and 3.

TABLE 2

| Treatment Identification Letter | Coefficient of Thermal Expansion (°C.$^{-1}$ × $10^{-7}$)* Treatment Time (days) | | | | | | | | | |
|---|---|---|---|---|---|---|---|---|---|---|
| | 1 | 2 | 3 | 4 | 8 | 9 | 16 | 27 | 32 | 83 |
| A | 8.9 | | | | 8.4 | 8.6 | 8.3 | 8.1 | | |
| B | 6.8 | | 6.2 | | | 5.8 | | 5.5 | | 5.3 |
| C | 7.8 | | 7.5 | | | 7.5 | | 7.0 | | 6.7 |
| D | 7.3 | | 7.2 | | | 7.0 | 6.9 | | | |
| E | 6.4 | 6.2 | | | 6.1 | | 6.0 | | | |
| F | 6.0 | 5.7 | | 5.6 | 5.2 | | 5.0 | | 4.7 | |
| G | 4.8 | 4.5 | | 4.4 | 4.4 | | 4.3 | — | | |

*At temperatures of 25–800° C.

TABLE 3

| Treatment Identification Letter | Coefficient of Thermal Expansion (°C.$^{-1}$ × $10^{-7}$)* Treatment Time (hours) | | | | | |
|---|---|---|---|---|---|---|
| | 0.38 | 0.75 | 1.5 | 3.0 | 6.0 | 12.0 |
| F | 8.1 | 7.8 | 7.4 | 7.5 | 6.8 | 6.2 |
| G | 6.8 | 6.2 | 5.5 | 5.8 | 5.0 | 4.9 |

*At temperatures of 25–800° C.

The coefficients of thermal expansion in Tables 2 and 3 are plotted as separate curves for each treatment letter versus treatment time on regular and logarithmic time scales in FIGS. 1 and 2, respectively. The data from this example indicate that all treatments reduced the coefficient of thermal expansion and that the extent of such reduction increased with increasing treatment severity (i.e., increased temperature, relative humidity, and treatment time). FIG. 1 shows that the reduction in the coefficient of thermal expansion is greatest at the beginning of each treatment and that the rate of this reduction decreases as time passes. FIG. 2 shows that the coefficient of thermal expansion decreases linearly with the logarithm of the treatment time. This indicates that for each treatment, the coefficient of thermal expansion decreases in accordance with the following logarithmic relationship:

$$C = m \ln t + b, \qquad \text{(Equation 1)}$$

where:
C is the coefficient of thermal expansion,
ln t is the natural logarithm of the aging time,
b is the coefficient of thermal expansion after one unit of treatment time, and
m is the slope of the line.

Values of m and b (for aging times measured in days) obtained by linear regression analysis of the experimental data in Tables 2 and 3 for Treatments A–G are listed in Table 4. Also listed in Table 4 are values of the correlation coefficient r that is a measure of how well the experimental data "fit" the regression line, a perfect fit being ±1, depending on the sign of slope m. The high values of r in Table 4 indicate that the experimental data are an excellent fit with Equation 1.

TABLE 4

| Treatment | m | b | r |
|---|---|---|---|
| A | −0.30 | 9.1 | −0.94 |
| B | −0.34 | 6.7 | −0.98 |
| C | −0.22 | 7.8 | −0.97 |
| D | −0.15 | 7.3 | −0.99 |
| E | −0.13 | 6.4 | −0.96 |
| F | −0.42 | 6.1 | −0.98 |
| G | −0.48 | 4.6 | −0.97 |

Although the coefficient of thermal expansion does decrease in specimens subjected to ambient conditions (e.g., Treatment C) and even at extremely low humidity levels (e.g., Treatment A), this effect is greatly accelerated at higher temperatures, at higher relative humidities, and, particularly, with water immersion. For example, according to these data, the reduction in the coefficient of thermal expansion after one day in boiling water would require approximately 5700 years under natural ambient atmospheric conditions to achieve.

Example 2

Cordierite honeycomb articles were manufactured using the process and materials described in Example 1. These articles, in the form of cylinders measuring 10.6 cm×9.7 cm, had 46 cells per square centimeter and webs 0.28 millimeters thick. After they were fired, these articles were immersed in liquid water (i.e., Treatments N and O), contacted with water vapor in a humidity cabinet (i.e., Treatments H, J, L, and M), or subjected to ambient conditions (i.e., Treatments I and K) under the conditions set forth in Table 5.

TABLE 5

| Treatment Identification Letter | Treatment Conditions | | | Coefficient of Thermal Expansion at 25 to 800° C. (°C.$^{-1}$ × 10$^{-7}$) | Thermal Shock Resistance (°C.) |
|---|---|---|---|---|---|
| | Temperature (°C.) | Relative Humidity (%) | Time (Days) | | |
| H | 50 | 70 | .33 | 7.0 | 812 |
| I | — | — | ∼0.00+ | 7.2 | 812 |
| J | 80 | 70 | 0.33 | 6.8 | 900 |
| K | 27* | 71* | 7.00 | 7.3 | 900 |
| L | 50 | 98 | 0.33 | 6.5 | 912 |
| M | 80 | 98 | 0.33 | 6.2 | 925 |
| N | 22 | Immersed | 0.50 | 6.5 | 925 |
| O | 98 | Immersed | 2.00 | 5.4 | 950 |

*Average Ambient Conditions
+Tested immediately after firing

Articles that were immersed in liquid water or aged in humidity cabinets were subsequently dried at 250° C. for 2 hours. Following these treatments, treated articles were cut dry, and specimens were used to measure the coefficient of thermal expansion, while the thermal shock resistance was determined from other treated articles. The latter test determined the temperature at which articles cracked when cycled three times in and out of a preheated electric kiln. Average coefficient of thermal expansion (at 25° to 800° C.) and thermal shock resistance values are listed in Table 5.

Treatment K simulates the ambient atmospheric treatment conditions for this product (i.e., ambient temperatures and humidity with an aging time of 7 days). The treatments are arranged in Table 5 in order of increasing thermal shock resistance. Surprisingly, the articles aged for 7 days under ambient conditions had a thermal shock resistance considerably better than that of several other conditions despite its rather high coefficient of thermal expanion. However, these data show that Treatments L, M, N, and O resulted in articles with a lower coefficient of thermal expansion and a higher thermal shock resistance than that resulting from ambient treatment for 7 days. The best result was obtained by immersion in water at 98° C. for 2 days (i.e., Treatment O).

Example 3

A cordierite honeycomb article similar to that used in Example 1, but from another lot, was cut dry to provide 0.64 cm×0.64 cm×5.6 cm bars for treatment by immersion in water at various temperatures, as set forth in Table 6 below. The water-treated specimens were dried at 100° C. for 2 hours prior to measuring thermal expansion. The coefficient of thermal expansion of these articles, which was 6.8×10$^{-7}$° C.$^{-1}$ (measured between 25° and 800° C.) initially, was reduced to the values in Table 6 after treatment with water at the indicated temperatures and aging times.

TABLE 6

| Treatment Identification Letter | Treatment Conditions | | Coefficient of Thermal Expansion at 25 to 800° C. (°C.$^{-1}$ × 10$^{-7}$) |
|---|---|---|---|
| | Temp. (°C.) | Aging Time (days) | |
| P | 22 | 0.125 | 6.2 |
| P | 22 | 0.250 | 5.6 |
| P | 22 | 0.500 | 5.0 |
| P | 22 | 1.000 | 5.1 |
| P | 22 | 2.000 | 4.8 |
| P | 22 | 4.000 | 4.6 |
| P | 22 | 8.000 | 3.8 |
| Q | 50 | 0.250 | 5.3 |
| Q | 50 | 1.000 | 4.6 |
| Q | 50 | 4.000 | 3.9 |
| R | 75 | 0.250 | 4.4 |
| R | 75 | 1.000 | 3.5 |
| R | 75 | 4.000 | 3.8 |
| S | 100 | 0.125 | 4.6 |
| S | 100 | 0.250 | 3.9 |
| S | 100 | 0.500 | 4.2 |
| S | 100 | 1.000 | 3.4 |
| S | 100 | 2.000 | 3.3 |
| S | 100 | 4.000 | 3.2 |
| S | 100 | 8.000 | 3.2 |

These data show that water immersion is very effective in reducing the coefficient of thermal expansion. Regression analysis of these data yielded the following relationship:

$$C = 5.40 - 0.0175\ T - 0.534\ \ln t + 0.00220 T \ln t$$

$$R^2 = 90\%$$

Where:

C is the coefficient of thermal expansion ($\times 10^{-7}$ °C.$^{-1}$)

T is the water temperature (° C.), t is the water immersion time (days), and

R is the multiple correlation coefficient, where $R^2 = 100\%$ constitutes an exact fit.

This equation indicates that the coefficient of thermal expansion is reduced by increasing the water temperature and increasing the immersion time. As in Example 2, the coefficient of thermal expansion decreased linearly with the logarithm of the immersion time.

Example 4

Specimens identical with those used in Example 3 were treated with water vapor in humidity cabinets for up to 4 days under the conditions set forth in Table 7. The coefficient of thermal expansion (at 25° to 800° C.) for these specimens, which was $6.8 \times 10^{-7}$ °C.$^{-1}$ prior to any treatment, was reduced to the values in Table 6.

TABLE 7

| Sample Identification Letter | Temperature (°C.) | Relative Humidity (%) | Aging Time (days) | Coefficient Thermal Expansion at 25 to 800° C. (°C.$^{-1} \times 10^{-7}$) |
| --- | --- | --- | --- | --- |
| T | 40 | 25 | 0.125 | 6.8 |
|   |    |    | 0.250 | 6.5 |
|   |    |    | 0.500 | 7.0 |
|   |    |    | 1.000 | 6.5 |
|   |    |    | 2.000 | 6.5 |
|   |    |    | 4.000 | 6.5 |
| U | 40 | 98 | 0.125 | 6.1 |
|   |    |    | 0.250 | 5.9 |
|   |    |    | 0.500 | 5.6 |
|   |    |    | 1.000 | 5.6 |
|   |    |    | 2.000 | 5.2 |
|   |    |    | 4.000 | 5.4 |
| V | 60 | 60 | 0.125 | 6.6 |
|   |    |    | 0.250 | 6.1 |
|   |    |    | 0.500 | 6.0 |
|   |    |    | 1.000 | 6.3 |
|   |    |    | 2.000 | 6.0 |
|   |    |    | 4.000 | 6.0 |
| W | 80 | 25 | 0.125 | 6.5 |
|   |    |    | 0.250 | 6.5 |
|   |    |    | 0.500 | 7.0 |
|   |    |    | 1.000 | 6.0 |
|   |    |    | 2.000 | 6.2 |
|   |    |    | 4.000 | 6.4 |
| X | 80 | 98 | 0.125 | 5.3 |
|   |    |    | 0.250 | 5.2 |
|   |    |    | 0.500 | 5.2 |
|   |    |    | 1.000 | 5.0 |
|   |    |    | 2.000 | 5.2 |
|   |    |    | 4.000 | 5.1 |

Multiple regression analysis of these data resulted in the following relationship:

$$CTE = 6.74 - 6.96 \times 10^{-5} H^2 - 1.19 \times 10^{-4} T - 0.117 \cdot \ln t$$

$$R^2 = 88\%$$

Where,

C is the coefficient of thermal expansion,

H is the relative humidity (%),

T is the temperature (° C.), and ln t is the natural logarithm of time in days, and R is the multiple correlation coefficient, where $R^2 = 100\%$ constitutes an exact fit.

The data in Table 7 show the benefit of treating cordierite samples with water vapor at a high temperature (i.e. up to 8020 C.) and a high relative humidity to maximize reduction of the coefficient of thermal expansion. Example 4 also confirms that the decrease in the coefficient of thermal expansion varies directly with the logarithm of the aging time. A comparison of these data with those of Table 6 shows that water immersion is generally more effective in reducing the coefficient of thermal expansion than treatment with water vapor in a humidity cabinet, even at 80° C. and a relative humidity of 98%.

Example 5

A cordierite honeycomb lot of the type described in Example 1 was found to have a thermal expansion coefficient, for the range 25°-800° C., of $8.1 \times 10^{-7}$ °C.$^{-1}$ measured one day after removal from the firing kiln. With the passage of time, the ware was subjected to ambient atmospheric conditions (i.e. 22° C. and a relative humidity of about 35%) so that the thermal expansion coefficient decreased as shown by line A in FIG. 3. After 7 days had elapsed following firing, the honeycomb articles were immersed in water at 22° C. and at 100° C. in order to reduce the thermal expansion coefficient further and then dried at 110° C. for 2 hours. The reductions in thermal expansion coefficient with aging time in water at 22° C. and at 100° C. are shown in FIG. 3 as curves B and C, respectively. For similar periods of ambient atmospheric treatment, the thermal expansion coefficient of such pieces continued to decline, but at a much lower rate than the immersed pieces. These data indicate that a treatment time of about 0.6 days in 22° C. water was sufficient to reduce the thermal expansion coefficient (at 25° to 800° C.) by $1 \times 10^{-7}$ °C.$^{-1}$. In 100° C. water, the time required to reduce the coefficient (at 25° to 800° C.) by $1 \times 10^{-7}$ °C.$^{-1}$ was about 0.025 days (i.e. 36 minutes). At intermediate temperatures, aging times between these values would be required.

Example 6

A cordierite honeycomb monolith was prepared by mixing talc, clay, calcined clay, and alumina in amounts suitable to form a cordierite composition. After the mixture was plasticized with methyl cellulose, sodium stearate, and water in a muller mixer, it was extruded through a steel die in a honeycomb configuration. After the honeycomb-shaped article was dried, it was fired in a periodic gas-fired kiln at 1400° C. The fired monolith was cut into axial rods, measuring 0.70 cm × 0.70 cm × 5.1 cm, which equates to a volume of 2.5 cc.

The initial coefficient of thermal expansion of the samples, between 25° C. and 800° C., was measured with a DILATRONIC I.S. 1200° automatic dilatometer, made by Theta Industries, Inc., 26 Valley Road, Port Washington, N.Y. The initial coefficient of thermal expansion value for these samples was $7.3 \times 10^{-7}$ °C.$^{-1}$.

The samples were then placed in a glass tube attached to a flask containing boiling water. The samples were preheated by an electric furnace surrounding the glass tube to a selected treatment temperature, while a heater for the flask was adjusted to boil off 2.5 ml of water per minute. Using this equipment, the samples were subjected to steam treatment temperatures of 150°, 200°, 300°, 400°, and 500° C. for times of both 1.5 and 6 hours.

The coefficient of thermal expansion (° C.$^{-1} \times 10^{-7}$), between 25° C. and 800° C., was then measured for each of the samples treated with the dilatometer. The results of these tests are set forth below in Table 8.

TABLE 8

| Temperature (°C.) | Coefficient of Thermal Expansion at 25 to 800° C. ($°C.^{-1} \times 10^{-7}$) | | |
|---|---|---|---|
| | Treatment Times (hrs) | | |
| | 0 | 1.5 | 6.0 |
| 150 | 7.3 | 7.0 | 6.4 |
| 200 | 7.3 | 6.9 | 6.7 |
| 300 | 7.3 | 7.2 | 7.2 |
| 400 | 7.3 | — | 6.9 |
| 500 | 7.3 | 6.8 | 7.0 |

These data show that processes of steam treating cordierite for up to 6 hours at temperatures of 300° C.-500° C. do not reduce the coefficient of thermal expansion by $1.0 \times 10^{-7}$ $°C.^{-1}$, measured between 25° C. and 800° C.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A process of reducing a ceramic article's coefficient of thermal expansion comprising:
   providing an anisotropic, polycrystalline sintered ceramic article having cordierite as its primary phase and an oxide composition comprising 9-20 wt. % MgO, 30-50 wt. % $Al_2O_3$, and 41-56.6 wt. % $SiO_2$ and
   contacting the ceramic article either with liquid water under time and temperature conditions effective to reduce the article's coefficient of thermal expansion, measured between 25° and 800° C., by at least $1 \times 10^{-7}$ $°C.^{-1}$ during said contacting or with water vapor at a temperature of 50°-200° C. and at a relative humidity of 60% or greater to reduce the article's coefficient of thermal expansion, measured between 25° C. and 800° C., by at least $1 \times 10^{-7}$ $°C.^{-1}$ during said contacting.

2. A process according to claim 1, wherein said contacting is with liquid water.

3. A process according to claim 2, wherein the water for said contacting is at a temperature of 50° C. or greater.

4. A process according to claim 3, wherein the water for said contacting is at a temperature of 90° C. or greater.

5. A process according to claim 2, wherein said contacting is under conditions effective to reduce the article's coefficient of thermal expansion, measured between 25° and 800° C., by at least $2.0 \times 10^{-7}$ $°C.^{-1}$ during said contacting.

6. A process according to claim 2, wherein said article is an extruded honeycomb, having a matrix of thin walls forming a multiplicity of open ended cells extending from one end to another end of the honeycomb and the thin walls having a substantially smaller coefficient of thermal expansion in the direction parallel to the axes of the open ended cells than transverse to the thin walls.

7. A process according to claim 2, wherein said article is at least 95 wt. % crystalline cordierite.

8. A process according to claim 1, wherein said providing comprises:
   selecting raw materials comprising clay and other ceramic materials in amounts suitable to form a batch composition by weight on an oxide basis comprising 9-20 wt. % MgO, 30-50 wt. % $Al_2O_3$, and 41-56.5 wt. % $SiO_2$, wherein the clay is selected from the group consisting of platelet clay, stacked clay which can be delaminated into platelets during processing, and mixtures thereof;
   blending the raw materials with an effective amount of vehicle and extrusion aids to impart plastic formability and green strength to the raw materials and to delaminate a substantial amount of the stacked clay into platelets;
   anisostatically forming the raw materials into a green article to impart a consistent planar orientation to the platelet clay;
   drying the green article; and
   firing the dried green article at a temperature and for a time sufficient substantially to complete the cordierite phase formation.

9. A process according to claim 8, wherein said article is an extruded honeycomb, having a matrix of thin walls forming a multiplicity of open ended cells extending from one end to another end of the honeycomb and the thin walls having a substantially smaller coefficient of thermal expansion in the direction parallel to the axes of the open ended cells than transverse to the thin walls.

10. A process according to claim 2, wherein said contacting is for a period of less than 8 hours.

11. A process according to claim 1, wherein said contacting is with water vapor.

12. A process according to claim 11, wherein said contacting is at a temperature of 70°-150° C. or more and a relative humidity of 80% or more.

13. A process according to claim 12, wherein said contacting is at a temperature of 80°-100° C. or greater and a relative humidity of 90% or greater.

14. A process according to claim 11, wherein said article comprises an extruded honeycomb, having a matrix of thin walls forming a multiplicity of open ended cells extending from one end to another end of the honeycomb and the thin wall having a substantially smaller coefficient of thermal expansion in the direction parallel to the axes of the open ended cells than transverse to thin walls.

15. A process according to claim 11, wherein said contacting is for a period of less than 20 hours.

16. A process according to claim 11, wherein said article is at least 95 wt. % crystalline cordierite.

17. A process according to claim 11, wherein said contacting is at a temperature in excess of ambient atmospheric conditions surrounding and outside the contact zone.

18. A process according to claim 11, wherein said contacting is at a relative humidity in excess of ambient atmospheric conditions surrounding and outside the contact zone.

19. A process according to claim 11, wherein said contacting is at both a relative humidity and a temperature in excess of ambient atmospheric conditions surrounding and outside the contact zone.

20. A process according to claim 1, wherein the ceramic article is not coated with a catalyst during said contacting.

* * * * *

UNITED STATES PATENT AND TRADEMARK OFFICE
CERTIFICATE OF CORRECTION

PATENT NO. : 5,275,771
DATED : January 4, 1994
INVENTOR(S) : Edward A. Bush and Rodney I. Frost It is certified that error appears in the above-identified patent and that said Letters Patent is hereby corrected as shown below:

Col. 5, line 60 "56.6%"
should be "56.5%"

Col. 7, line 50 "100°"
should be "1000°"

Col. 7, line 55 "100°"
should be "110°"

Col. 10, line 16 "100°"
should be "110°"

Col. 12, line 3 "8020C"
should be "80°C"

Col. 13, line 32 "56.6%"
should be 56.5 wt % --

Signed and Sealed this

Twenty-eighth Day of June, 1994

Attest:

BRUCE LEHMAN

Attesting Officer    Commissioner of Patents and Trademarks